United States Patent [19]

Schrott

[11] Patent Number: 5,452,139
[45] Date of Patent: Sep. 19, 1995

[54] SECURITY MIRROR CONSTRUCTION WITH READILY REPLACEABLE MIRROR PANELS

[76] Inventor: Gregory A. Schrott, 2059 Belgrave Ct., Simi Valley, Calif. 93063

[21] Appl. No.: 263,184

[22] Filed: Jun. 21, 1994

[51] Int. Cl.⁶ .............................................. G02B 7/182
[52] U.S. Cl. ...................... 359/871; 359/870; 359/883; 248/475.1; 248/488; 248/551
[58] Field of Search ................ 40/201, 611, 615, 619; 52/786, 788, 789, 790; 248/466, 475.1, 488, 551, 552, 553; 359/838, 840, 870, 871, 883, 884

[56] References Cited

U.S. PATENT DOCUMENTS

| 1,835,042 | 12/1931 | Hammer | 248/551 |
|---|---|---|---|
| 2,928,199 | 3/1960 | Novak | 248/551 |
| 3,125,316 | 3/1964 | Wilmhoff | 248/551 |
| 3,284,940 | 11/1966 | Putman | 248/551 |
| 3,612,469 | 10/1971 | Dennis | 248/551 |
| 3,709,456 | 1/1973 | Pietsch | 248/551 |
| 3,743,389 | 7/1973 | Stiller et al. | 359/871 |
| 3,952,436 | 4/1976 | Kuhnke | 248/488 |
| 4,322,053 | 3/1982 | Logie | 248/488 |
| 4,492,430 | 1/1985 | Morris et al. | 359/883 |
| 5,189,822 | 3/1993 | Schmanski et al. | 248/551 |

FOREIGN PATENT DOCUMENTS 0713438  7/1965  Canada .................. 248/475.1

*Primary Examiner*—Paul M. Dzierzynski
*Assistant Examiner*—John Juba, Jr.
*Attorney, Agent, or Firm*—Robert J. Schaap

[57] ABSTRACT

A security mirror construction with a mirror panel which can only be replaced by one having generally authorized access to the mirror construction and where the mirror panel itself is generally isolated so that damage to the mirror panel by vandalism or otherwise is eliminated and where injury to a user in the event of a broken mirror panel can normally be avoided. The mirror construction is comprised of an outer housing having a base plate for supporting a mirror panel on the base plate and within the mirror housing. A bracket arrangement retains the mirror panel on the base plate and within a fixed position in the housing. A transparent cover panel, preferably formed of a shatter-proof material, such as plastic, extends over the mirror panel and is also held within the housing by another bracket arrangement. In this way, if a vandal attempts to damage the mirror construction, damage will normally occur to the exterior plastic panel. Moreover, if a vandal attempts to apply graffiti on the mirror construction, the graffiti will occur on the replaceable outer transparent panel and not the mirror panel itself.

28 Claims, 3 Drawing Sheets

SECURITY MIRROR CONSTRUCTION WITH READILY REPLACEABLE MIRROR PANELS

BACKGROUND OF THE INVENTION

1. Field of the Invention

This invention relates in general to certain new and useful improvements in a security mirror construction with a readily replaceable mirror panel, as well as a method of replacing a mirror panel by someone having authorized access thereto and more particularly to a mirror construction of the type stated which utilizes an outer housing having a mirror panel retained therein with an outer transparent panel extended over the mirror panel and also retained within the housing.

2. Brief Description of the Related Art

In recent years, and particularly in large suburban areas, vandalism of both public and private property has become quite pronounced. This is particularly true in areas which are not frequently policed, either by an attendant of a public property or an attendant or owner of a private property. In many cases, where mirrors are available for public use in hotels or other lodging establishments and restaurants, vandals often attempt to mark the mirror panels with graffiti. This is particularly true in areas which are frequented by gangs.

The marking of a mirror panel with a marking pen or the like is not necessarily a significantly serious problem, due to the fact that the markings can be removed, either by washing or, if necessary, by scraping with a razor knife. However, in many cases vandals will utilize a spray paint which is not readily removable. In this case, since the labor required to remove the graffiti from the mirror panel is cost prohibitive, the owner of the establishment will typically find it less expensive to replace the entire mirror.

In addition to the foregoing, a breaking of a mirror panel, either by acts of vandalism or accidents, can often result in injury to employees of the establishment and to the public in general who may frequent the establishment. This is a particularly pronounced problem if the location of the broken mirror is in areas used by the public, since a member of the public could injure himself or herself before the owner or attendant of the establishment becomes aware of the broken mirror panel. Thus, injury to the public or to an employee capable of cutting himself or herself seriously on an edge of the mirror can result before the owner or attendant of the establishment has the availability of changing the mirror panel.

In addition to the foregoing, vandals will often attempt to break a mirror panel for no other reason then to create an act of vandalism. Consequently, it is important to maintain the mirror panel in a construction in which the mirror panel is not immediately available to access by the public in general, but which is readily available to one having authorized access to change the mirror panel, if required.

Heretofore, there has not been any mirror construction which provides for ready access to a mirror panel by one having authorized access, but which also precludes general access to the mirror panel by the public in general.

OBJECTS OF THE INVENTION

It is, therefore, one of the primary objects of the present invention to provide a mirror construction having a mirror panel in which access thereto is generally precluded to the public in general, but which is readily accessible by one having authorized access.

It is another object of the present invention to provide a mirror construction of the type stated which utilizes a security mirror housing such that vandals and others cannot have immediate access to a mirror panel, but view a mirror image through a transparent cover panel.

It is a further object of the present invention to provide a security mirror construction of the type stated in which a glass mirror panel is fixedly retained within a mirror construction housing and in which a shatterproof transparent cover sheet is located over a mirror panel to preclude a sharp edge of a mirror panel from being contacted by an individual in the event of breakage to the mirror panel and which also precludes acts of vandalism directly to the mirror panel.

It is an additional object of the present invention to provide a mirror construction of the type stated which is sturdy in its construction, but which is also relatively economical to manufacture.

It is yet another object of the present invention to provide a security mirror construction of the type stated which can be manufactured in a variety of sizes and shapes and with different mirror construction appearances, but which all accomplish the desired results.

It is another salient object of the present invention to provide a method of enabling access to a mirror panel in a mirror housing by one having authorized access thereto but which generally precludes ready access to the public in general thereby enabling only one having authorized access to change or clean a mirror panel.

With the above and other objects in view, my invention resides in the novel features of form, construction, arrangement and combination of parts presently described and pointed out in the claims.

BRIEF SUMMARY OF THE DISCLOSURE

A security mirror construction which precludes unauthorized access to a mirror panel but which allows ready access to one having authorized access and where the mirror panel is isolated from contact by the public in general. Thus, the mirror construction of the invention finds effective employment in institutions, both public and private, which are frequented by the public in general and who could otherwise cause damage to or be injured by a broken mirror panel.

The mirror construction of the present invention comprises an outer housing which is generally rectangular in shape, although any desired shape can be employed. An enlarged opening is formed on the front of the housing with an integral peripheral flange to retain one or more panels within the mirror housing. Access to the mirror housing is thereby normally obtained from the rear surface thereof.

Located within the mirror housing is a base plate and which can be retained on the housing by any of a number of conventional fasteners. Brackets or braces may also be used to secure the base plate to the rear surface of the housing. Located in juxtaposed relationship to a forwardly presented surface of the base plate is a mirror panel. This mirror panel may be retained in a fixed position within the housing by means of specially designed brackets which are, in turn, secured to either the side wall of the mirror housing or to the base plate. For this purpose, additional braces may also be used for securing the mirror panel in a fixed position within the housing, if desired.

The brackets which are used to retain the mirror panel are somewhat Z-shaped with one long leg adapted for securement to the housing or to the baseplate by mechanical fasteners, such as sheet metal screws or the like. Another leg extends in an offset arrangement to the leg for attachment and in generally parallel arrangement thereto and is designed to effectively clamp the mirror panel to the baseplate and to the housing.

Extending over the mirror panel within the housing and in marginal registration with the mirror panel is an outer transparent panel which is formed of a shatter-proof material, such as a plastic sheet or the like. The type of shatter-proof material could be used for this purpose includes, for example, transparent polyethylene sheets, polybutadiene sheets and the like. Essentially, any sheet which is transparent and which is quite durable to withstand mild forces such as from cutting, hitting or the like, can be used.

The outer transparent panel fits within the opening formed by the peripheral flange and effectively hides the mirror panel from contact by the public in general. Additional brackets, similar to those used for holding the pair of panels, are also used for securing the outer transparent panel within the mirror housing. These brackets generally have the same size and shape as the brackets used for securing the mirror panel. Again, and if desired, additional transverse braces may be used for holding the outer panel in positional relationship over the mirror panel.

The outer panel is also effectively clamped by securing the brackets which hold the outer panel either to the side wall of the mirror housing or to the baseplate. Again, attachment can be achieved through mechanical fasteners such as sheet metal screws or the like. The screws, or other mechanical fasteners, which are used for securing the housing together in a final form are preferably of the security type, that is, fasteners having heads which are accommodated only by a special type of tool. While tools of this type can be obtained, they are not readily accessible to the public in general and thus, one creating an act of vandalism normally does not have the required tool to disassemble the mirror construction housing or to remove the same from a wall to which it is secured.

The present invention also provides a unique method which allows for the authorized access to a mirror panel located within a security mirror housing and which generally precludes access by individuals not having the authorization for such access. In this way, only the owner or attendant of an establishment having the mirror construction is capable of either changing or cleaning a mirror panel located within a mirror housing. Moreover, since vandals or the public in general will not have access to the mirror panel, graffiti markings on the mirror panel are generally eliminated. While a vandal may admittedly place graffiti on the outer transparent panel, and even of a relatively permanent type of marking, this panel is readily replaceable. Moreover, the outer panel is relatively inexpensive so that the cost to replace the outer panel is relatively nominal. Further, one having the required tool with a head to fit the heads of the mechanical fasteners can easily and readily obtain access to the mirror panel for changing the same.

It is recognized that one with a hammer striking a hard blow to the outer panel could potentially break the mirror panel. Otherwise, the mirror panel could be broken merely by normal accident. In either case, and even if the mirror panel itself did shatter, the pieces of glass will be retained within the housing by the outer cover panel and the baseplate. Thus, and again, since access is only obtained by one having authorized access, injury to employees or other attendants, or the public in general, is minimized, if not eliminated.

The rear construction of the present invention can be made in various sizes and shapes and with numerous types of outer appearances to conform to the needs of a user. Moreover, other embodiments of the mirror construction are available. One of the preferred embodiments is illustrated and described in the following detailed description and illustrated in the accompanying drawings. It is to be understood that this detailed description and the accompanying drawings are only set forth for purposes of illustrating and describing the general principals of the invention. Thus, the invention is not to be taken in a limiting sense.

BRIEF DESCRIPTION OF THE DRAWINGS

Figure 1:
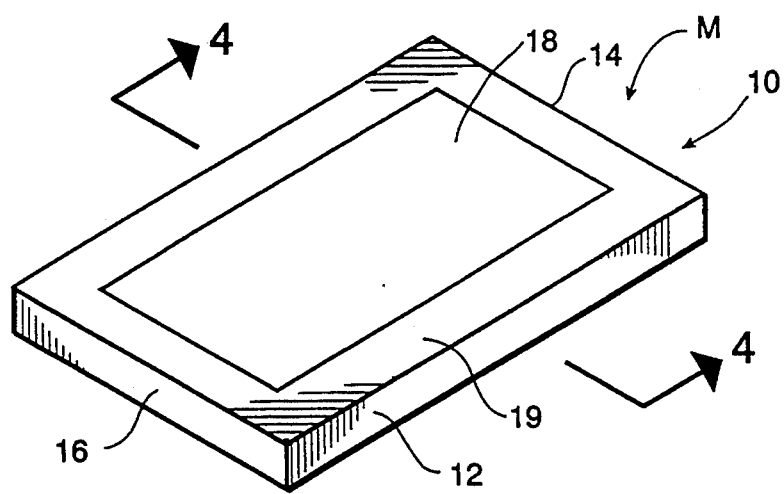
Figure 2:
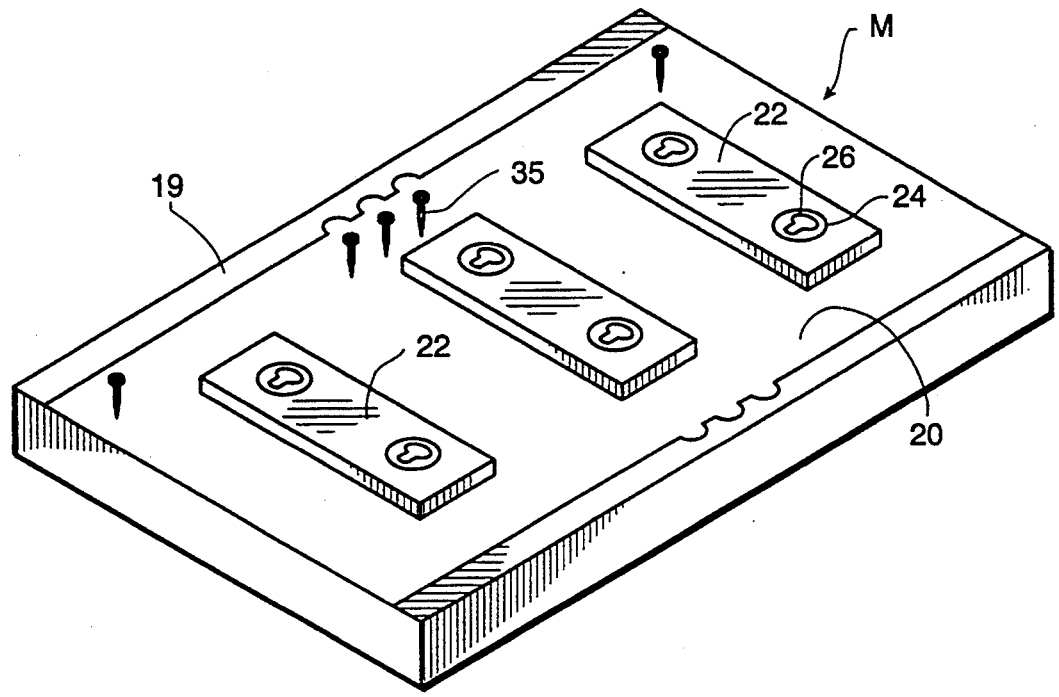
Figure 3:
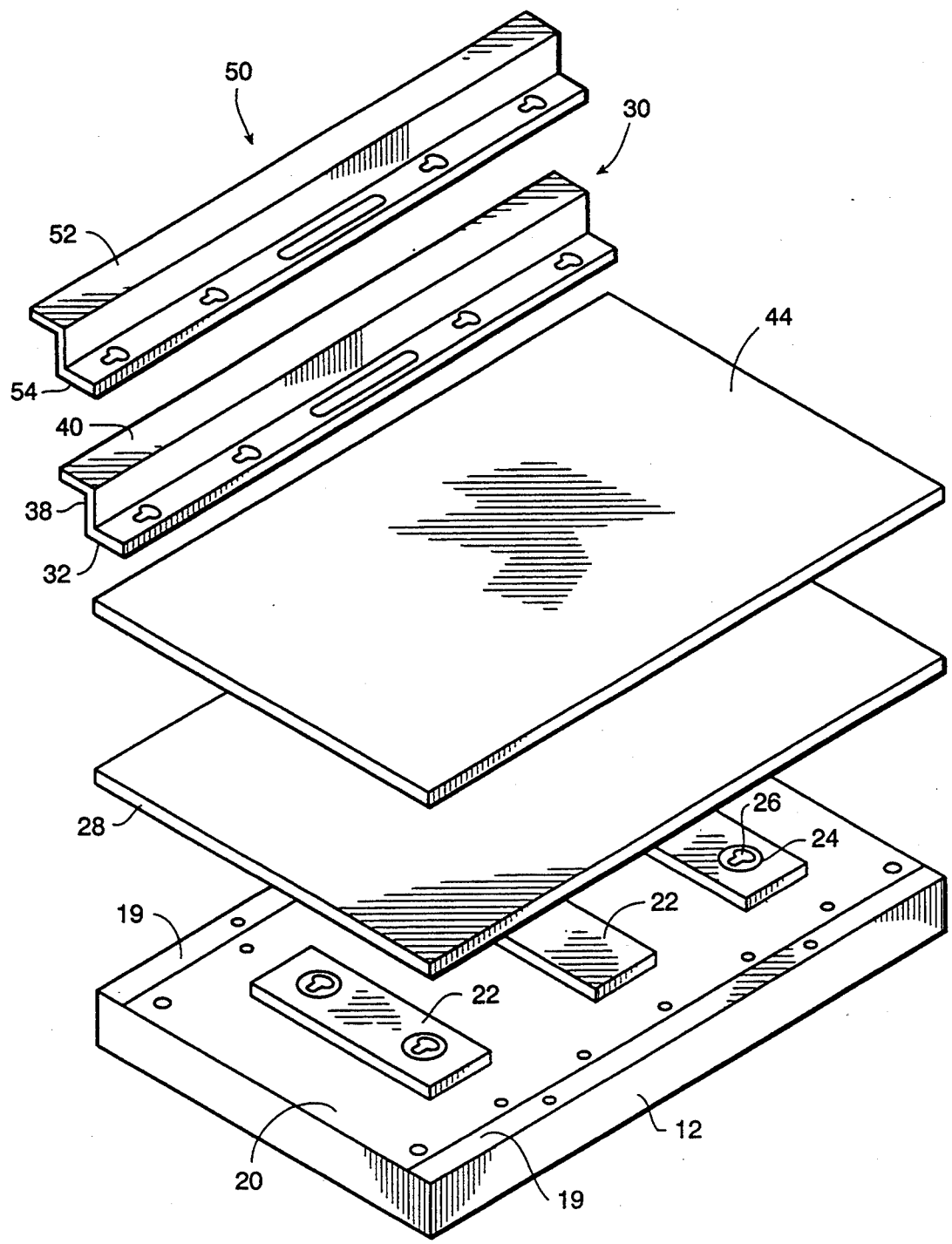
Figure 4:
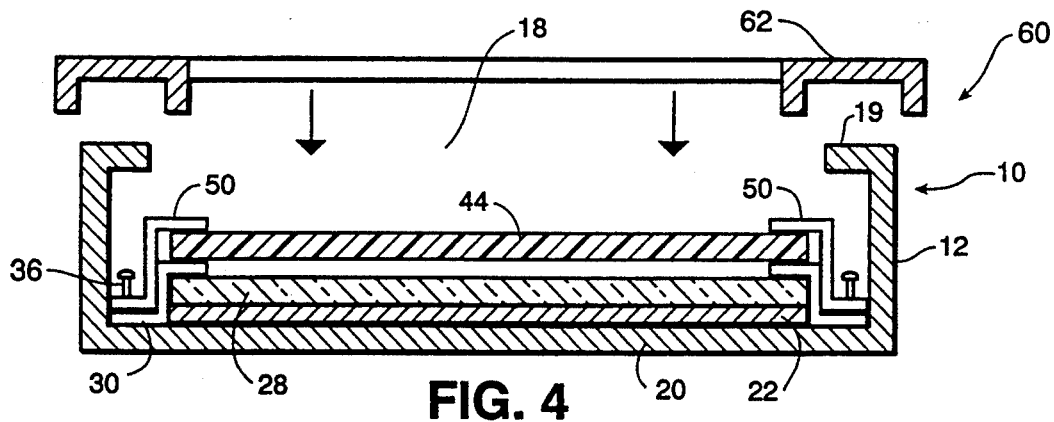
Figure 5:
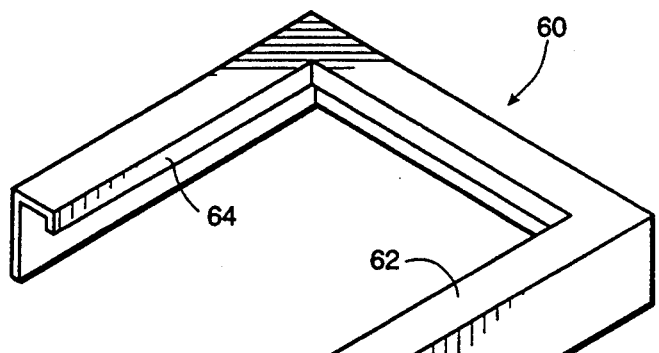
Figure 6:
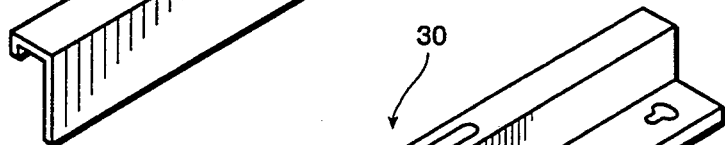
Figure 7:
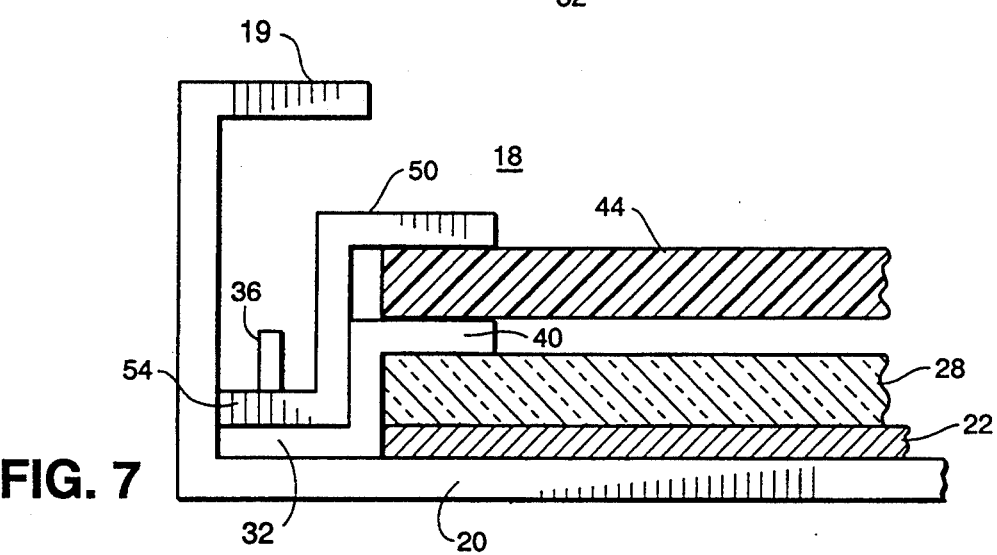

Having thus described the invention in general terms, reference will now be made to the accompanying drawings in which:

FIG. 1 is a perspective view of a mirror construction which is constructed in accordance with and embodies the present invention;

FIG. 2 is a perspective view showing an interior portion of the mirror construction of the present invention;

FIG. 3 is a partially exploded perspective view showing a portion of the mirror construction of the present invention;

FIG. 4, is a vertical sectional view, taken substantially along line 4—4 of FIG. 1;

FIG. 5 is a fragmentary perspective view showing a portion of an outer cap forming part of the mirror construction of the present invention;

FIG. 6 is a perspective view of one of the brackets used in the mirror construction of the present invention; and FIG. 7 is an enlarged fragmentary vertical sectional view, somewhat similar to FIG. 4, and showing the details of the arrangement of a shatter-proof panel and a mirror panel in the housing of the invention.

DETAILED DESCRIPTION OF A PREFERRED EMBODIMENT

Referring now in more detail and by reference characters to the drawings which illustrate a preferred embodiment of the invention, M designates a security mirror construction in which access to the interior thereof is only available by one having authorized access. This type of mirror construction M reduces acts of vandalism and potential injury to others, as heretofore described and as also hereinafter described in more detail.

The mirror construction of the present invention comprises an outer housing 10 which is rectangular in shape, as shown, and having a pair of side walls 12 and upper and lower walls 14 and 16. The mirror housing 10 has an enlarged opening 18 in the front portion thereof framed by a peripherally extending in-turned flange 19 integral with the side walls and the upper wall 14 and lower wall 16. In effect, the outer housing 10 forms somewhat of an outer peripheral frame for holding the other components forming part of the mirror construction M, as hereinafter described.

Mounted within the outer housing 10 is a bottom plate, or base plate 20 which is also rectangularly shaped and has a size approximately equivalent to that of the rectangularly shaped mirror housing 10. In a preferred embodiment, the mirror housing 10 and the base plate 20 are constructed of a stainless steel, although other metals could be employed. For that matter, other materials of construction, such as plastic or preferably reinforced plastics could be used in formation of the outer housing 10 and the baseplate 20.

Extending transversely cross the baseplate 20 is a plurality (three, as shown) of cross ribs or so-called "cushions" 22. These cushions 22 are, in turn, secured to the baseplate 20 and also the mirror housing 10 by means of sheet metal screws 24 which extend through openings 26 formed in the cross-ribs 22 and aligned openings (not shown) in the baseplate 20. Facewise disposed upon the upper surface of each of the cross ribs or so-called "cushions" 22 is a glass mirror panel 28 which has a length and width slightly less than the overall length and width, respectively, of the mirror housing 10, as best shown in FIGS. 3 and 4 of the drawings. The mirror panel 28 is constructed in a conventional fashion and generally includes a glass sheet with a mirror coating on one flat surface thereof.

The mirror panel 28 is fixedly retained within the mirror housing 10 by means of a pair of vertically arranged brackets 30 with each bracket located on an opposite vertical side of the mirror housing 10, also as best shown in FIG. 4 of the drawings. The bracket 30 is somewhat Z-shaped, as shown in FIGS. 6 and 7 and includes a first leg 32 having fastener receiving openings 34 for securement to the baseplate 20 with sheet metal screws or like fasteners 36. The bracket 30 is also provided with a perpendicularly arranged leg 38 and a third leg 40 which functions as a retaining leg and is parallel in space to the first leg 32. By reference to FIGS. 4 and 7 of the drawings, it can be seen that the third leg 40 is adapted to extend over a longitudinal edge of the mirror panel 28. With the construction, as illustrated, the first leg 32 which is receives the sheet metal fasteners 36 while being parallel to the third leg 40 is offset from the third leg 40, as shown. Thus, and by means of this construction, the mirror panel 28 is retentively held within a fixed position within the mirror housing 10.

It can be observed that it is easy to remove the mirror panel 28 when one has access to the interior of the mirror housing 10 by merely removing the sheet metal screws 36 and thereafter removing the bracket 30 on each of the opposite sides of the mirror housing 10. In this way, the mirror panel 28 can easily be lifted out of the mirror housing 10. Located over the mirror panel 28 in generally parallel relationship thereto is a shatter-proof panel 44, also as best shown in FIGS. 4 and 7 of the drawings. This panel 44 actually functions as an outer or face panel for the mirror construction M. The shatter-proof panel 44 is preferably made of a plexiglass material, although any suitable transparent sheet material, other than glass, could be used. Thus, transparent polystyrene sheets, or the like, may be used as the shatter-proof panel 44.

The face panel, or shatter-proof panel 44 also has essentially the same width and the same length as the mirror panel 28, so as to be completely disposed over and cover the mirror panel 28. An additional pair of brackets 50, which are substantially similar to the previously described brackets 30, are also used for holding the face panel 44 in a fixed position within the mirror housing 10 and relative to the enlarged opening 18. These brackets 50 similarly have a leg 52 disposed over a longitudinal edge of the face panel 44, as shown in FIG. 7. However, by reference to FIG. 4, it can be observed that a pair of these brackets 50 are employed with each bracket 50 located on an opposite longitudinal side of the mirror housing 10. The bracket 50 similarly has an offset parallel leg disposed over the first leg 32. In this way, aligned openings in the leg 54 which is aligned with openings in the first legs leg 32, and the baseplate 20 can be used for retentively securing the face sheet 44 within the mirror housing 10.

In accordance with the above outlined construction, it can be seen that the mirror panel 28 is effectively isolated from contact by individuals who do not have authorized access to the interior of the mirror housing 10. For this purpose, if desired, an outer cap 60 can be disposed over the upper end of the mirror housing 10. The outer cap 60 has a peripheral size and shape approximately equivalent to that of the mirror housing 10. Moreover, the mirror housing 10 is provided with a peripheral rim 62 adapted to extend over the peripheral flange 19 and a downwardly struck inner peripheral flange 64 which is adapted to engage the insider of the flange 19. This outer cap 60 is also retained on the mirror housing 10 by means of sheet metal fasteners.

The outer cap 60 is preferably retained on the mirror housing 10 by means of security-type sheet metal fasteners. In the same respect, the baseplate 20 is secured to the mirror housing 10 by means of security-type sheet metal fasteners. These sheet metal fasteners are known in the art and are usually only turned so as to be locked into place or removed by means of tools having a special size and shape to conform to the head of the fastener. While the tools themselves are available the public, in general, a vandal normally does not utilize these tools and therefore, does not have ready access to the same. Therefore, the public, in general, and in particular, vandals, would not have immediate access to the interior of the mirror housing 10.

The party who does have authorized access would be provided with a tool having a tool-engaging surface which conforms to the head of the mechanical fastener, such as the sheet metal screws which are used. In this way, if a mirror panel is broken and access is required to the interior of the mirror housing 10, the outer cap 60 is removed by simply removing the sheet metal screws. Thereafter, the brackets 50 are removed so that the face plate or shatter-proof panel 44 can be removed. This is followed by removal of the brackets 30 and subsequent access to the mirror panel 28.

When replacing a mirror panel 28, the panel 28 is disposed upon the cushions 22, as previously shown and described, and then locked in place by means of the brackets 30 and the associated sheet metal screws 36. However, before actually utilizing the screws 36, the shatter-proof panel 44 is then placed in position on the upper surface of the brackets 30 and retained by like brackets 50. Thereafter, the sheet metal screws 36 may be used to secure the entire assembly to the mirror housing 10.

It can be observed that in the event that the glass panel 28 shatters, for any reason, the pieces of the mirror panel 28 will be retained within the mirror housing 10. They are effectively enclosed by the frame of the mirror housing 10 and by the baseplate 20 on one side and the shatter-proof panel 44 on the opposite side. In this way, broken pieces cannot escape the mirror housing 10.

Thus, there has been illustrated and described a unique and novel security mirror construction which fulfills all of the objects and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A security mirror construction which precludes immediate access to a mirror panel therein and allows reflected light viewing through a shatter-proof transparent panel, said mirror construction comprising:
   a) an outer housing;
   b) a baseplate associated with said housing;
   c) a mirror panel located in said housing in relation to said baseplate and having a mirrored side and rear side;
   d) means on said baseplate for receiving and directly engaging the rear side of the mirror panel and retaining and supporting same in spaced apart relation to said baseplate;
   e) a shatter-proof transparent panel disposed over said mirror panel and completely enclosing said mirror panel in said housing; and
   f) a bracket means for retaining the mirror panel and the shatter-proof panel in spaced apart relationship to one another and in a fixed position in the housing so that the mirror panel is effectively isolated within and with respect to the housing.

2. The security mirror construction of claim 1 wherein the bracket means comprises first bracket means which retains the mirror panel in the housing and second bracket means which retains the shatter-proof panel in the housing.

3. The security mirror construction of claim 2 wherein in that the first and second bracket means each comprise brackets having a pair of parallel and offset legs connected by a perpendicularly arranged connecting leg.

4. The mirror construction of claim 2 wherein the first bracket means comprises a pair of first brackets with each one of the pair located on opposite longitudinal sides of the housing.

5. The security mirror construction of claim 2 wherein each of the first bracket means and the second bracket means have aligned fastener receiving openings which receive common fasteners for securing the first bracket means and second bracket means to the housing.

6. The security mirror construction of claim 1 wherein the housing has a peripheral rim with a large viewing opening for a viewer to look through the transparent shatter-proof panel.

7. The security mirror construction of claim 1 wherein said means on said baseplate comprises a plurality of spaced apart ribs which are located immediately beneath the rear surface of said mirror panel, and said mirror panel is held in engagement on said ribs by said bracket means.

8. A security mirror construction which precludes unauthorized access to a mirror panel located within the mirror construction, said mirror construction comprising:
   a) an outer housing;
   b) a baseplate associated with said housing;
   c) a mirror panel located within said housing in relation to the baseplate;
   d) a shatter-proof transparent panel disposed over the mirror panel and being retained within the housing;
   e) a bracket means for retaining said mirror panel and said transparent panel in spaced apart relationship to one another and in a fixed position in said outer housing;
   f) an outer cover rim extendable over said housing and having an opening for viewing through the transparent panel and the mirror panel; and
   g) means for completely closing said housing with said cover rim on said homing in an unauthorizedly non-openable condition with mechanical fasteners and which fasteners have heads which are engageable only by tools having tool ends with a configuration matching the heads and which thereby precludes unauthorized opening of the housing.

9. The security mirror construction of claim 8 wherein mechanical fasteners are used for securing the bracket means to the housing and which mechanical fasteners have heads engageable only by a tool having a tool end with a configuration essentially conforming to the heads.

10. The security mirror construction of claim 8 wherein the bracket means comprises first bracket means which retains the mirror panel in the housing and second bracket means which retains the shatter-proof panel in the housing.

11. The security mirror construction of claim 10 wherein the first and second bracket means each comprise brackets having a pair of parallel and offset legs connected by a perpendicularly arranged connecting leg.

12. The security mirror construction of claim 10 wherein the first bracket means comprises a pair of first brackets with each one of the pair located on opposite longitudinal sides of the housing.

13. A method of allowing access to a mirror panel in a mirror panel housing only when access is authorized thereto, said method comprising:
   a) disposing a mirror panel within an outer housing which has a baseplate on the housing;
   b) locating first brackets over said mirror panel, such that the brackets engage edges of the mirror panel to hold the mirror panel in place in the housing;
   c) disposing a transparent shatter-proof panel over the mirror panel;
   d) locating second brackets over edges of the shatter-proof transparent panel to hold the transparent panel in place in the housing; and
   e) completely closing said housing, except for a viewing opening in the housing through which a viewer may view through the transparent shatter-proof panel an image reflected from the mirror panel.

14. The method of claim 13 wherein the method comprises inserting mechanical fasteners through aligned openings in the aforesaid brackets.

15. A security mirror construction which precludes immediate access to a mirror panel therein and allows reflected light viewing through a shatter-proof transparent panel, said mirror construction comprising:

a) an outer housing;
b) a baseplate associated with said housing;
c) a mirror panel located in said housing in relation to said baseplate;
d) a shatter-proof transparent panel disposed over said mirror panel and completely enclosing said mirror panel in said housing;
e) a first bracket means for retaining the mirror panel in a fixed position in the housing; and
f) a second bracket means for retaining the shatter-proof transparent panel in a fixed position in the housing.

16. The security mirror construction of claim 15 wherein the first bracket means and the second bracket means each comprise brackets having a pair of parallel and offset legs connected by a perpendicularly arranged connecting leg.

17. The mirror construction of claim 15 wherein the first bracket means comprises a pair of first brackets with each one of the pair located on opposite longitudinal sides of the housing, 18. The security mirror construction of claim 15 wherein each of the first bracket means and the second bracket means have aligned fastener receiving openings which receive common fasteners for securing the bracket means to the housing, 19. A security mirror construction which precludes unauthorized access to a mirror panel located within the mirror construction, said mirror construction comprising:
a) an outer housing;
b) a baseplate associated with said housing; a mirror panel located within said housing in relation to the baseplate;
d) first bracket means retaining the mirror panel in the housing;
e) a shatter-proof transparent panel disposed over the mirror panel and being retained within the housing; and
f) second bracket means retaining the transparent panel in the housing; and
g) means for completely enclosing said housing in a non-openable condition with mechanical fasteners and which fasteners have heads which are engageable only by tools having tool ends with a configuration matching the heads and which thereby precludes unauthorized opening.

20. The security mirror construction of claim 19 wherein the first and second bracket means each comprise brackets having a pair of parallel and offset legs connected by a perpendicularly arranged connecting leg.

21. The security mirror construction of claim 19 wherein the first bracket means comprises a pair of first brackets with each one of the pair located on opposite longitudinal sides of the housing.

22. A security mirror construction which precludes immediate access to a mirror panel therein and allows reflected light viewing through protective transparent panel, said mirror construction comprising:
a) an outer housing;
b) a baseplate associated with said housing;
c) a mirror panel located in said housing in relation to said baseplate and having a mirrored side and rear side;
d) means associated with said baseplate for retaining said mirror panel relative to said baseplate within said housing;
e) a protective transparent panel disposed over said mirror panel and completely enclosing said mirror panel in said housing;
f) a bracket means for retaining the mirror panel and protective panel in spaced apart relationship to one another and in a fixed position in the housing so that the mirror panel is effectively isolated within and with respect to the housing and;
g) locking fastener elements used in conjunction with said bracket means for allowing removal of the transparent panel without removal of the mirror panel and for replacement of the transparent panel without remounting of the mirrors panel.

23. The security mirror construction of claim 22 wherein the bracket means comprises first bracket means for retaining the mirror panel in the housing and second bracket means for retaining the protective panel in the housing and said locking fastener elements comprise a first plurality of locking elements associated with the first bracket means and a second plurality of locking fastener elements associated with said second bracket means.

24. The security mirror construction of claim 23 wherein the first and second bracket means each comprise brackets having a pair of parallel and offset legs connected by a perpendicularly arranged connecting leg.

25. The mirror construction of claim 23 wherein the first bracket means comprises a pair of first brackets with each one of the pair located on opposite longitudinal sides of the housing.

26. The security mirror construction of claim 23 wherein each the first bracket means and the second bracket means have aligned fastener receiving openings which receive common mounting fasteners for securing the first bracket means and second bracket means to the housing and which mounting fasteners releasably receive the locking fastener elements.

27. The security mirror construction of claim 22 wherein the means associated with the baseplate comprises a plurality of spaced apart ribs which are located immediately beneath the rear surface of said mirror panel, and said mirror panel is held in engagement on said rib means by said bracket means.

28. A security mirror construction which precludes immediate access to a mirror panel therein and allows reflected light viewing through a shatter-proof transparent panel, said mirror construction comprising:
a) an outer housing;
b) a baseplate associated with said housing;
c) a mirror panel located in said housing in relation to said baseplate and having a mirrored side and rear side;
d) means on said baseplate for receiving and directly engaging the rear side of the mirror panel and retaining and supporting same in spaced apart relation to said baseplate;
e) a shatter-proof transparent panel disposed over said mirror panel and completely enclosing said mirror panel in said housing;
f) a bracket means for retaining the mirror panel and the shatter-proof panel in spaced apart relationship to one another and in a fixed position in the housing so that the mirror panel is effectively isolated within and with respect to the housing;
g) common fastener stems extending through said bracket means;
h) first locking means associated with said bracket means and cooperating with said stems for releasably holding said mirror panel; and
i) second locking means cooperating with said stems and associated with said bracket means for holding said transparent panel.

* * * * *